March 10, 1964     H. STÜDLI, SR     3,124,061
MULTIPLE SCREW PRESS
Filed Nov. 20, 1962
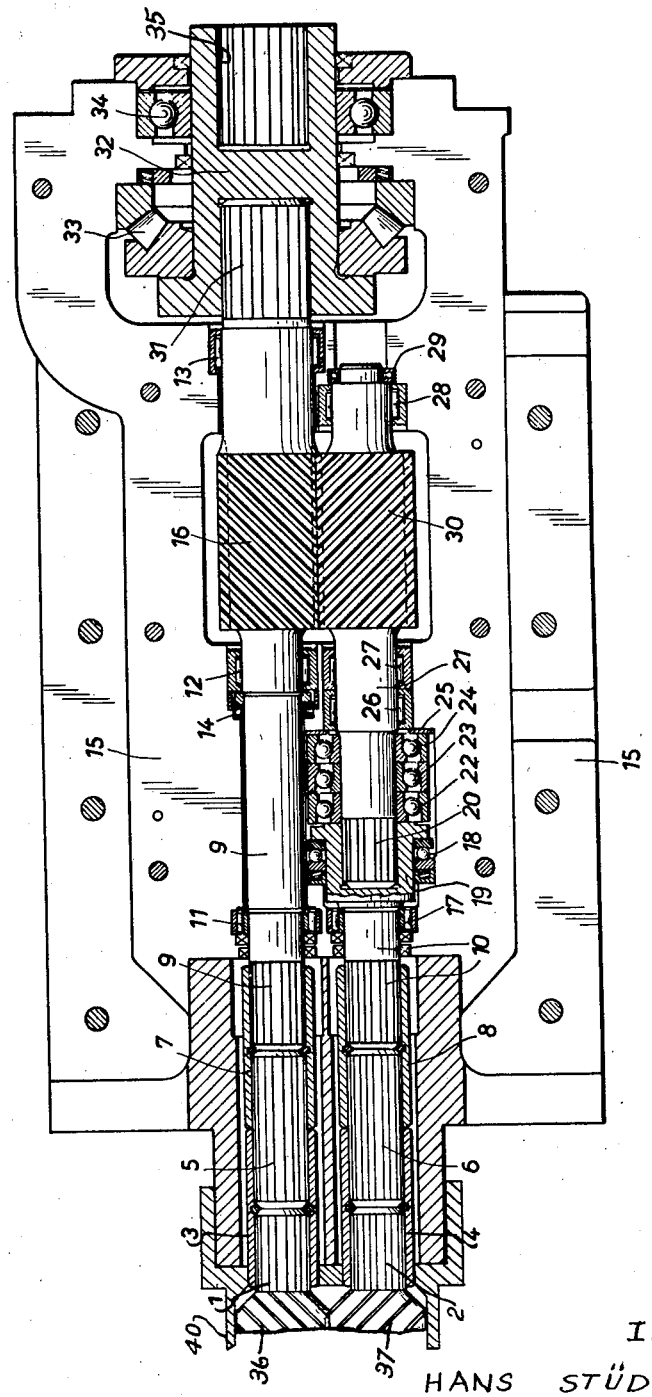
INVENTOR
HANS STÜDLI SR.

United States Patent Office 3,124,061
Patented Mar. 10, 1964

3,124,061
MULTIPLE SCREW PRESS
Hans Stüdli, Sr., Hard, Winterthur, Switzerland
Filed Nov. 20, 1962, Ser. No. 242,036
Claims priority, application Switzerland Jan. 20, 1959
3 Claims. (Cl. 100—146)

The present invention relates to a double or multiple screw press of the type in which a screw is driven by means of a main driving shaft and at least one additional screw is driven from the main driving shaft by means of at least one supplementary driving shaft. The present application is a continuation-in-part of my co-pending application, Serial No. 3,334, filed January 19, 1960, which is now abandoned.

In such screw type presses difficulties have been experienced to take up the great axial pressures exerted upon the main and supplementary driving shafts by the screws. Axial thrust bearings have previously been arranged both on the main driving shaft and on the supplementary driving shaft, in order to resist said pressures. However, the interspace between the main driving shaft and the supplementary driving shaft remains limited, since the distance separating the shafts is determined by the spacing of the axes of the cooperating screws and the diameter of said shafts depends on the torque to be transmitted. Comparatively small axial thrust bearings can therefore only be used, so that a plurality of bearings must be connected in parallel and the bearings of the main and the supplementary driving shafts have to be displaced with respect to each other. For this reason, the resulting press structure is extremely long in axial direction and the risk arises that the relatively small axial thrust bearings will be damaged in operation, causing breakdowns, which are very undesired in such continuously operating presses.

It is an object of the invention to overcome the above mentioned difficulties.

In a screw press according to the invention the supplementary driving shaft is driven from the main driving shaft by means of a helical gear arranged to transmit at least a major portion of the axial pressure exerted by the screws upon the supplementary driving shaft onto the main driving shaft, said main driving shaft being extended in rearward direction beyond the supplementary driving shaft and provided with axial thrust bearings on its extended portion for taking up the axial thrusts acting on the main and the supplementary shafts. Since in this case the space available for the axial thrust bearing is no longer limited, the latter may be built of such sturdy construction that it practically cannot be damaged in operation.

The present invention will now be described in more detail with reference to the accompanying drawing, illustrating by way of example an axial section through a double screw type press according to the invention.

The illustrated double screw press is especially adapted for extruding plastic materials to form continuous tubes or rods. In such twin screw presses extremely high pressures must be exerted to the plastic materials. Therefore, a very great torque must be transmitted by the drive and very great axial pressures are exerted on the screws and the adjoined drive shafts. The press comprises two cooperating screws, having threads 36 and 37 and two end portions 1 and 2, respectively. The screws are located in a press room, or chamber 40, partially shown in the figure but with its feed opening not visible, and in which the plastic is to be worked and entirely separated from gearing of the drive transmission which is housed in casing 15. These end portions 1, 2 are positively connected by multiple splines and sleeves 3, 4 to intermediate shafts 5 and 6, respectively which in turn are also connected to shafts 9 and 10, respectively by means of multiple splines and sleeves 7, 8. The shaft 9 representing the main driving shaft is supported in a two-piece casing 15 by means of radial needle bearings 11, 12, 13 and a small thrust ball bearing 14. The main driving shaft 9 is provided with helical gear teeth 16, having a pitch of approximately 45°. The shaft 10 is supported in a radial needle bearing 17 and a thrust ball bearing 18 and forms a tubular coupling part 19, with which the end portion 20 of the supplementary driving shaft 21 is connected by multiple splines. The coupling part 19 bears against an annular member 25 by intermediary of three special axial thrust ball bearings 22, 23, 24 connected in parallel. The annular member 25 is abutting against a shoulder of the casing 15. The supplementary driving shaft 21 is supported in the casing 15 by means of three radial needle bearings 26, 27, 28 and fixed in its position by a thrust ball bearing 29. The shaft 21 has helical gear teeth 30 having a pitch of also approximately 45° and meshing with the helical gear teeth 16 formed on the main driving shaft 9. The end portion 31 of the main driving shaft 9, extending rearwardly beyond the end of the supplementary driving shaft 21, is connected by multiple splines 31 to a flanged connecting sleeve 32 which is supported in the casing 15 by means of a sturdy axial thrust conical roller bearing 33 and a radial ball bearing 34. The connecting sleeve 32 is provided with a socket 35 for securing the end of a drive shaft which may be the output shaft of an infinitely variable gear.

In operation, the helical gearing 16, 30 transmits the driving torque from the main driving shaft 9 to the supplementary driving shaft 21. Simultaneously, the axial pressure exerted by the screw end 2 upon the supplementry driving shaft 21 is transmitted to the main driving shaft 9 and taken up by the axial thrust bearing 33. With an increasing torque transmitted by the main driving shaft the axial pressure transmitted from the supplementary driving shaft 21 to the main driving shaft 9 increases. By providing a pitch angle of the gear of 45° and the pitch of screw threads 36 and 37 being in the same directions respectively as the pitch of gears 16 and 30, practically the entire axial pressure exerted upon the supplementary driving shaft 21 is transmitted to the main driving shaft 9 and taken up by the axial thrust bearing 33. The axial thrust bearings 22, 23, 24 then serve only to take up compensating pressures. Furthermore, the axial thrust bearings 14, 18 and 29 solely serve for fixing the position of the shafts during idling or in return movement and are not effective when the press is in operation.

Instead of the described double screw press, a multiple screw press may be so arranged that each supplementary driving shaft is connected by a helical gear to the main driving shaft, in order to transmit the axial pressures of all supplementary driving shafts to the main driving shaft and to be able to provide a sturdy axial thrust bearing for supporting an extended portion of the main driving shaft.

I claim:

1. A twin screw press comprising two cooperating screws of opposite pitch, a main drive shaft connected to one screw, an auxiliary drive shaft connected to the other screw and parallel with the main drive shaft, said main and auxiliary shafts being of relatively large diameter and disposed relatively close together and spaced less than the diameter of either shaft, a pair of helical gears only and without additional gearing operatively mounted on and interconnecting said two shafts for driving the auxiliary drive shaft from the main drive shaft and provided with a pitch angle of substantially 45°, the helical gear mounted on the main drive shaft having a pitch in the same direction as the pitch of the said one screw and opposite to the pitch of the gear mounted on the auxiliary shaft and the pitch of the latter gear being in the same direction as the pitch of the said other screw, said screws projecting radially of the shafts a distance less than the diameter of either shaft, the main drive shaft having an extension projecting beyond the end of said auxiliary drive shaft, and an axial thrust bearing on said extension of greater diameter than the distance between the axes of the two shafts for taking up the axial thrust exerted by the said one screw onto the main drive shaft as well as the axial thrust exerted by the other screw transmitted by the said helical gears from the auxiliary shaft onto the main drive shaft.

2. A twin screw press comprising two cooperating screws of opposite pitch located in a press chamber in which material is to be worked, a main drive shaft connected to one screw, an auxiliary drive shaft connected to the other screw and parallel with the main drive shaft, said main and auxiliary shafts being disposed relatively close together as related to the diameters of the shafts, a pair of helical gears only and without additional gearing operatively mounted outside said press chamber on and interconnecting said two shafts for driving the auxiliary drive shaft from the main drive shaft and provided with a pitch angle of substantially 45°, the helical gear mounted on the main drive shaft having a pitch in the same direction as the pitch of the said one screw and opposite to the pitch of the gear mounted on the auxiliary shaft and the pitch of the latter gear being in the same direction as the pitch of the said other screw, the main drive shaft having an extension projecting beyond the end of said auxiliary drive shaft, and an axial thrust bearing on said extension of greater diameter than the distance between the axes of the two shafts for taking up the axial thrust exerted by the said one screw onto the main drive shaft as well as the axial thrust exerted by the other screw transmitted by the said helical gears from the auxiliary shaft onto the main drive shaft.

3. A twin screw press comprising two cooperating screws of opposite pitch, a main drive shaft connected to one screw, an auxiliary drive shaft connected to the other screw and parallel with the main drive shaft, said main and auxiliary shafts being disposed relatively close together as related to the diameters of the shafts, a pair of helical gears only and without additional gearing operatively mounted on and interconnecting said two shafts for driving the auxiliary drive shaft from the main drive shaft and provided with a pitch angle of substantially 45°, the helical gear mounted on the main drive shaft having a pitch in the same direction as the pitch of the said one screw and opposite to the pitch of the gear mounted on the auxiliary shaft and the pitch of the latter gear being in the same direction as the pitch of the said other screw, the main drive shaft having an extension projecting beyond the end of said auxiliary drive shaft, an axial thrust bearing on said extension of greater diameter than the distance between the axes of the two shafts for taking up the axial thrust exerted by the said one screw onto the main drive shaft as well as the axial thrust exerted by the other screw transmitted by the said helical gears from the auxiliary shaft onto the main drive shaft, axial thrust bearings on the auxiliary shaft for taking up compensating pressures of the screws, and further thrust bearings on the auxiliary and main drive shaft for holding the shafts in fixed positions during idling.

References Cited in the file of this patent

UNITED STATES PATENTS

| | | |
|---|---|---|
| 1,082,885 | Lewis | Dec. 30, 1913 |
| 1,876,064 | Lang | Sept. 6, 1932 |

FOREIGN PATENTS

| | | |
|---|---|---|
| 552,863 | Italy | Dec. 12, 1956 |